United States Patent
Arakawa et al.

(10) Patent No.: US 11,042,023 B2
(45) Date of Patent: Jun. 22, 2021

(54) WAVELENGTH VARIABLE INTERFERENCE FILTER HAVING SUBSTRATE HYDROXYL GROUP CONCENTRATION, ELECTRONIC COMPONENT, MANUFACTURING METHOD OF ELECTRONIC COMPONENT, AND ELECTRONIC APPARATUS

(71) Applicant: Seiko Epson Corporation, Tokyo (JP)

(72) Inventors: Katsuji Arakawa, Chino (JP); Susumu Shinto, Shiojiri (JP)

(73) Assignee: Seiko Epson Corporation

( * ) Notice: Subject to any disclaimer, the term of this patent is extended or adjusted under 35 U.S.C. 154(b) by 518 days.

(21) Appl. No.: 15/397,115

(22) Filed: Jan. 3, 2017

(65) Prior Publication Data

US 2017/0199372 A1   Jul. 13, 2017

(30) Foreign Application Priority Data

Jan. 12, 2016   (JP) .............................. JP2016-003292

(51) Int. Cl.
```
G02B 1/14      (2015.01)
G02B 5/28      (2006.01)
G02B 26/00     (2006.01)
```
(52) U.S. Cl.
CPC ............. G02B 26/001 (2013.01); G02B 1/14 (2015.01); G02B 5/288 (2013.01)

(58) Field of Classification Search
CPC ....... B81B 2203/04; G01J 3/0291; G01J 3/26; G01J 2003/262; G01J 2003/265; G01J 2003/267; G02B 1/14; G02B 5/28–289; G02B 6/29358; G02B 6/29395; G02B 26/001; G02B 26/002; G02B 26/007

USPC .......... 356/450–521; 359/260, 577–590, 850
See application file for complete search history.

(56) References Cited

U.S. PATENT DOCUMENTS

| | | | | |
|---|---|---|---|---|
| 5,349,456 A | * | 9/1994 | Iwanaga | C03C 3/06 349/158 |
| 6,653,024 B1 | * | 11/2003 | Shiraishi | G03F 1/48 430/5 |
| 6,727,025 B1 | | 4/2004 | Shiraishi | |
| 9,063,325 B2 | | 6/2015 | Sano et al. | |
| 2006/0179879 A1 | * | 8/2006 | Ellison | C03B 19/143 65/17.4 |
| 2007/0277555 A1 | | 12/2007 | Hino | |
| 2012/0044491 A1 | * | 2/2012 | Urushidani | G01J 3/0294 356/326 |

(Continued)

FOREIGN PATENT DOCUMENTS

JP    H11-109101 A    4/1999
JP    2006-213570 A   8/2006

(Continued)

*Primary Examiner* — Ryan S Dunning
(74) *Attorney, Agent, or Firm* — Harness, Dickey & Pierce, P.L.C.

(57) ABSTRACT

A wavelength variable interference filter includes a fixed substrate, a movable substrate that faces the first substrate, a fixed reflective film that is disposed between the fixed substrate and the movable substrate, and a movable reflective film that is disposed between the fixed reflective film and the movable substrate, in which the fixed substrate transmits light, the fixed reflective film includes silver, and a concentration of a hydroxyl group that the fixed substrate includes is 500 ppm or less or 1000 ppm or more.

14 Claims, 8 Drawing Sheets

(56) References Cited

U.S. PATENT DOCUMENTS

| | | | |
|---|---|---|---|
| 2012/0257280 A1 | 10/2012 | Sano et al. | |
| 2013/0181120 A1* | 7/2013 | Shinto | G02B 5/0808 250/226 |
| 2014/0061699 A1* | 3/2014 | Kim | H01L 33/54 257/98 |
| 2014/0240836 A1* | 8/2014 | Shinto | G02B 26/001 359/578 |
| 2015/0042362 A1 | 2/2015 | Shinto et al. | |
| 2015/0293301 A1* | 10/2015 | Huang | G02B 6/4215 385/14 |
| 2015/0353417 A1* | 12/2015 | Mori | C03C 17/007 359/599 |

FOREIGN PATENT DOCUMENTS

| | | |
|---|---|---|
| JP | 2012-042584 A | 3/2012 |
| JP | 2012-220765 A | 11/2012 |
| JP | 2013-148644 A | 8/2013 |
| JP | 2015-031942 A | 2/2015 |
| WO | WO-00-19271 A1 | 4/2000 |

\* cited by examiner

FIG. 3

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| PEAK HEIGHT OF HYDROXYL GROUPS | 0.030 | 0.031 | 0.050 | 0.060 | 0.602 | 0.626 | 0.703 | 0.813 |
| CONCENTRATION OF HYDROXYL GROUPS (ppm) | 49 | 51 | 84 | 100 | 1000 | 1039 | 1168 | 1351 |
| NUMBER OF BULGES ON REFLECTIVE FILM OUTER SURFACE (NUMBER) | 0 | 0 | 0 | 0 | 0 | 0 | 0 | 0 |

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|
| PEAK HEIGHT OF HYDROXYL GROUPS | 0.320 | 0.327 | 0.349 | 0.378 | 0.436 | 0.495 |
| CONCENTRATION OF HYDROXYL GROUPS (ppm) | 532 | 543 | 580 | 628 | 724 | 822 |
| NUMBER OF BULGES ON REFLECTIVE FILM OUTER SURFACE (NUMBER) | 410 | 520 | 788 | 642 | 231 | 53 |

WAVELENGTH VARIABLE INTERFERENCE FILTER HAVING SUBSTRATE HYDROXYL GROUP CONCENTRATION, ELECTRONIC COMPONENT, MANUFACTURING METHOD OF ELECTRONIC COMPONENT, AND ELECTRONIC APPARATUS

BACKGROUND

1. Technical Field

The present invention relates to a wavelength variable interference filter, an electronic component, a manufacturing method of electronic component, and an electronic apparatus.

2. Related Art

In the related art, a wavelength variable interference filter that regulates an interval between a pair of reflective films that are disposed facing one another using an electrostatic attractive force, and retrieves a desired wavelength of light through multiple interference of the reflective film gap, is known. The reflective films of the wavelength variable interference filter are provided with predetermined reflectances and profile irregularities in order to take out a desired wavelength of light.

For example, JP-A-2012-220765 proposes a wavelength variable interference filter that uses single-layered films of silver or a silver alloy as a pair of reflective films.

However, in the wavelength variable interference filter disclosed in JP-A-2012-220765, in certain cases, there is a problem in that, due to a thermal load that is applied, transformation occurs in the silver or the silver alloy that configures the reflective films. To explain in more detail, the chemical stability of silver and silver alloys is lower than that of gold, for example, and silver and silver alloys are materials in which it is easy for the atoms to move. Therefore, there is a possibility that minute bulges will be generated on the outer surfaces of the reflective films as a result of the atoms moving due to the effects of a thermal load and the passage of time, and cohesion occurring. When minute bulges are generated on the outer surfaces of the reflective films, it can lead to deteriorations in the profile irregularities and the reflectances of the reflective film, and the generation of irregular reflection. Accordingly, there is a concern that transformation of the silver or silver alloy reflective films will cause degradation of the optical characteristics such as the wavelength resolution and quality of the wavelength variable interference filter.

SUMMARY

The invention can be realized as the following aspects or application examples.

Application Examples

According to this application example, there is provided a wavelength variable interference filter including a first substrate, a second substrate that faces the first substrate, a first reflective film that is disposed between the first substrate and the second substrate, and a second reflective film that is disposed between the first reflective film and the second substrate, in which the first substrate transmits light, the first reflective film includes silver, and a concentration of a hydroxyl group that the first substrate includes is 500 ppm or less or 1000 ppm or more.

According to the application example, the cohesion of silver in the first reflective film, which includes silver, is supported by setting the hydroxyl group concentration of the first substrate to a predetermined range. As a result of this, it is unlikely that the first reflective film will be subjected to the effects of a thermal load or the passage of time, and therefore, transformation of the first reflective film is suppressed and the generation of bulges is suppressed. As a result of the generation of bulges in the first reflective film being suppressed, it is possible for the optical characteristics and quality, such as reflectance and profile irregularity of the first reflective film, of the wavelength variable interference filter to be retained over a long period of time. That is, as a result of suppressing the generation of transformation of the first reflective film, it is possible to provide a wavelength variable interference filter having improved reliability.

In the wavelength variable interference filter according to the application example, it is preferable that the first substrate be a quartz substrate.

According to the application example, it is possible to easily set the concentration of hydroxyl groups that the first substrate includes to the above-mentioned range.

In the wavelength variable interference filter according to the application example, it is preferable that the concentration of the hydroxyl group that the first substrate includes be 100 ppm or less or 1000 ppm or more.

According to the application example, the cohesion of silver in the first reflective film is further suppressed, and therefore, it is possible to further suppress the generation of bulges on the outer surface of the first reflective film.

It is preferable that the wavelength variable interference filter according to the application example further include a protective film that covers the first reflective film.

According to the application example, since the outer surface of the first reflective film is protected by the protective film, it is possible to suppress transformation of the first reflective film as a result of alleviating external (a gas phase) effects that the first reflective film is subjected to.

In the wavelength variable interference filter according to the application example, it is preferable that the protective film include indium gallium oxide.

According to the application example, since the protection of the outer surface of the first reflective film is enhanced and external effects are further alleviated, it is possible to reduce discoloration and transformation of the first reflective film.

In the wavelength variable interference filter according to the application example, it is preferable that a thickness of the first reflective film be 10 nm or more or 60 nm or less.

According to the application example, in addition to ensuring the required transmittance in the wavelength variable interference filter, an elaborate film is formed. Therefore, the protection of an interface between the first substrate and the first reflective film is enhanced, and therefore, it is possible to further suppress the generation of bulges.

In the wavelength variable interference filter according to the application example, it is preferable that the second substrate be a quartz substrate, the second reflective film include silver, a concentration of a hydroxyl group that the second substrate includes be 500 ppm or less or 1000 ppm or more, and the wavelength variable interference filter further include a protective film that covers the second reflective film.

According to the application example, since the cohesion of silver in the second reflective film is suppressed, and the protection of the second reflective film is enhanced, it is possible to reduce the generation of bulges on the outer surface of the second reflective film. As a result of this, the reliability of the wavelength variable interference filter is further improved.

According to this application example, there is provided an electronic component including the above-mentioned wavelength variable interference filter, a base substrate, a first lid portion, which is disposed facing the base substrate, and forms an accommodation portion for accommodating the wavelength variable interference filter between the first lid portion and the base substrate, and a joining member for joining the base substrate and the first lid portion.

According to the application example, as a result of mounting a wavelength variable interference filter having stable optical characteristics and quality, it is possible to provide an electronic component having improved reliability.

It is preferable that a manufacturing method of the electronic component according to the application example include configuring a housing by disposing the base substrate and the first lid portion using the joining member, and sealing the housing by heating the joining member.

According to the application example, since the first reflective film, which is unlikely to be subjected to the effects of a thermal load, is provided, it is possible to manufacture an electronic component having favorable optical characteristics and quality even if heating is included.

It is preferable that an electronic apparatus according to the application example include the above-mentioned wavelength variable interference filter.

According to the application example, a wavelength variable interference filter having stable optical characteristics and quality is provided, and it is possible to provide an electronic apparatus that uses an electronic component having improved reliability.

BRIEF DESCRIPTION OF THE DRAWINGS

The invention will be described with reference to the accompanying drawings, wherein like numbers reference like elements.

FIG. 3 is a table that shows conditions and evaluation results of quartz substrates according to examples.

DESCRIPTION OF EXEMPLARY EMBODIMENTS

Hereinafter, embodiments of the invention will be described with reference to the drawings. Additionally, in each of the drawings below, the scale of each layer and each member is altered from an actual scale in order to set each layer and each member to a recognizable size.

Embodiment 1

Wavelength Variable Interference Filter

Figure 1:
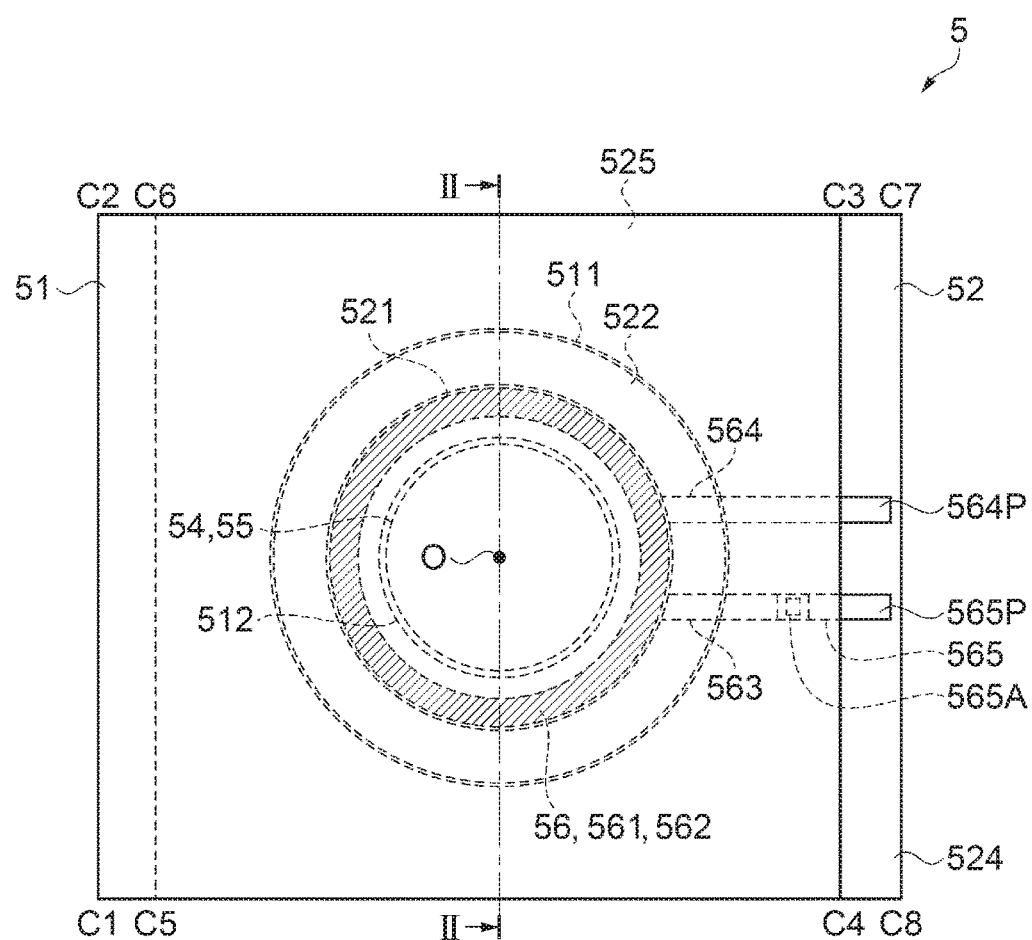
FIG. 1 is a plan view that shows a schematic configuration of a wavelength variable interference filter according to Embodiment 1.
Figure 2:
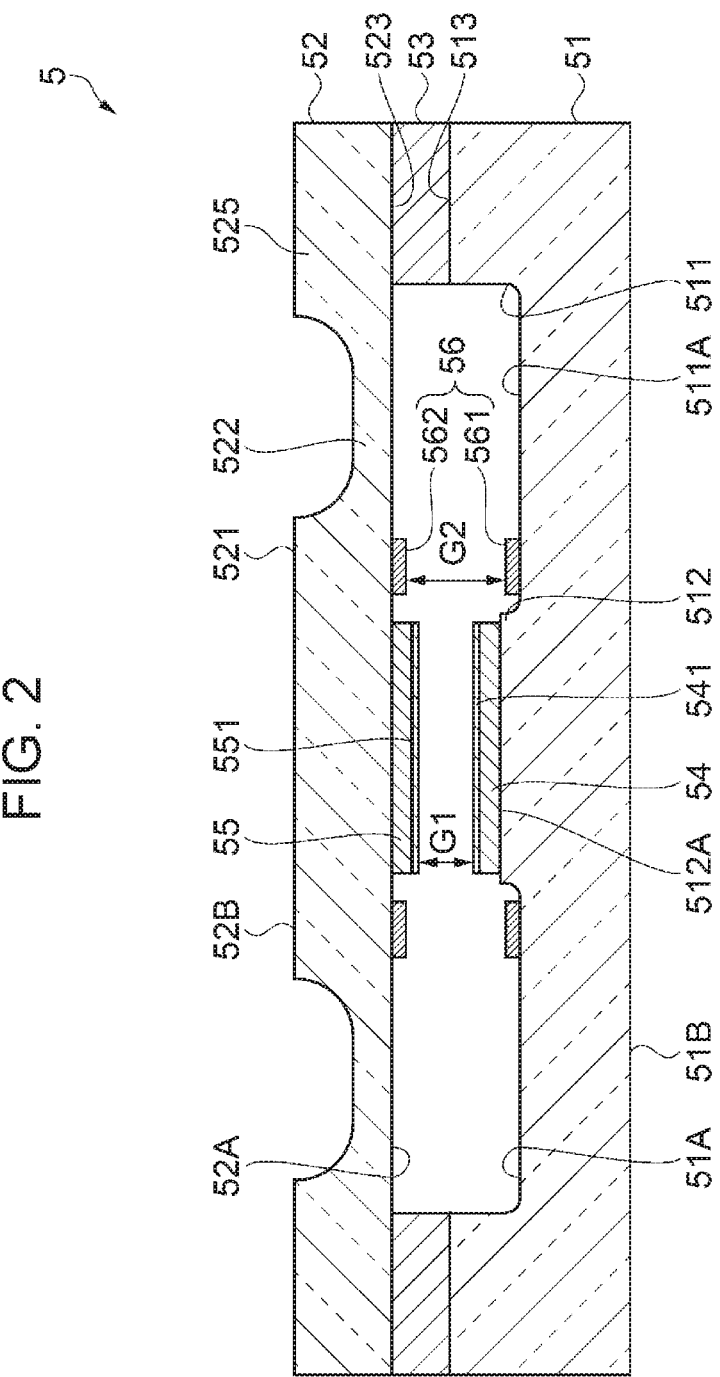
FIG. 2 is a cross-sectional view that shows a schematic configuration of the wavelength variable interference filter.

A configuration of a wavelength variable interference filter according to the present embodiment will be described with reference to FIGS. 1 and 2. FIG. 1 is a plan view that shows a schematic configuration of a wavelength variable interference filter. FIG. 2 is a cross-sectional view in which the wavelength variable interference filter in FIG. 1 is sectioned at II-II.

A wavelength variable interference filter 5 shown in FIG. 1 is a so-called Fabry-Perot etalon, and is an optical member in which the planar surfaces have substantially rectangular plate form. The wavelength variable interference filter 5 is provided with a fixed substrate 51 as a first substrate, and a movable substrate 52 as a second substrate that faces the fixed substrate 51. In this instance, from this point onwards, a planar view such as that shown in FIG. 1 in which the wavelength variable interference filter 5 is viewed from a substrate thickness direction of the fixed substrate 51 or the movable substrate 52 will be referred to as a filter planar view. In addition, the center of the fixed substrate 51 and the movable substrate 52 in the filter planar view will be set as a planar surface center point O.

The fixed substrate 51 includes a fixed reflective film 54 as a first reflective film, an electrode disposition groove 511, a reflective film installation portion 512, and the like. These components are provided in an annular form with the planar surface center point O as the substantial center thereof. In addition, the movable substrate 52 includes a movable reflective film 55 as a second reflective film, a movable portion 521, a holding portion 522 that holds the movable portion 521, and the like. These components are also provided in an annular form with the planar surface center point O as the substantial center thereof.

In addition, one end side (an edge C1-C2) of the fixed substrate 51 projects further on the outer side than a substrate end edge (an edge C5-C6) of the movable substrate 52. One end side (an edge C7-C8) of the movable substrate 52 projects further on the outer side than a substrate end edge (an edge C3-C4) of the fixed substrate 51, and an electrical surface 524 is formed by a projecting section.

The fixed substrate 51 and the movable substrate 52 are formed by quartz substrates that have a light transmissive property. As a result of this translucency, it is possible for light that is taken in (incident to) from the outer portion of the fixed substrate 51 side, to be taken out (emitted) from the movable substrate 52 side.

In addition, as shown in FIG. 2, a first joining surface 513 and a second joining surface 523 are respectively provided in the vicinity of the outer peripheral portion of the fixed substrate 51 and in the vicinity of the outer peripheral portion of the movable substrate 52. The first joining surface 513 and the second joining surface 523 are joined using a joining film 53. As a result of this, the fixed substrate 51 and the movable substrate 52 are made integral, and configure a housing of the wavelength variable interference filter 5. For example, as the joining film 53, a plasma polymerized film in which organopolysiloxane is a main component, is formed using a plasma chemical vapor deposition (CVD) method, or the like.

In the above-mentioned manner, the fixed reflective film 54 is provided in the fixed substrate 51, and the movable reflective film 55 is provided in the movable portion 521 of the movable substrate 52. The fixed reflective film 54 is disposed on a surface of the fixed substrate 51 that faces the movable substrate 52, and the movable reflective film 55 is disposed on a surface of the movable substrate 52 that faces the fixed substrate 51. In other words, the fixed reflective film 54 is disposed between the fixed substrate 51 and the movable substrate 52, and the movable reflective film 55 is disposed between the fixed reflective film 54 and the movable substrate 52. In addition, the fixed reflective film 54 and the movable reflective film 55 configure a pair of reflective films as a result of being disposed facing one another with an interval of a reflective film gap G1.

In addition, an electrostatic actuator 56 for adjusting the dimension of a reflective film gap G1 is provided in the wavelength variable interference filter 5. The electrostatic actuator 56 is provided with a fixed electrode 561 as a first electrode that is provided on the fixed substrate 51 side, and a movable electrode 562 as a second electrode that is provided on the movable substrate 52 side. Additionally, the fixed electrode 561 and the movable electrode 562 have a configuration of being in contact with the substrate outer surfaces of the fixed substrate 51 and the movable substrate 52, but are not limited to this configuration. For example, the above-mentioned components may have a configuration that is provided via another film member.

Fixed Substrate

The fixed substrate 51 includes a facing surface 51A that faces the movable substrate 52, and an outer side surface 51B on a side that is opposite to the facing surface 51A. The outer side surface 51B configures an optical surface, and light quantity loss due to scattering, and irregular reflection of light and fluctuations in the incidence angle and emission angle of light are suppressed.

In addition, for example, the fixed substrate 51 is formed by processing a quartz substrate made from a quartz glass that is prepared so that the thickness thereof is 600 µm. More specifically, the electrode disposition groove 511 and the reflective film installation portion 512 are formed on the facing surface 51A of the fixed substrate 51 by etching. It is possible to adopt an existing treatment method as the etching method. Examples include a wet etching treatment that uses a fluorine compound, a dry etching treatment that uses a fluorine-based gas, and the like.

A fixed electrode surface 511A is disposed on the bottom surface of the groove of the electrode disposition groove 511. The fixed electrode 561 that configures the electrostatic actuator 56 is provided on the fixed electrode surface 511A, and faces the movable electrode 562 of the movable portion 521. In order to ensure an insulating property of the movable electrode 562, an insulation film may be provided in the fixed electrode 561 on a surface that faces the movable electrode 562.

The reflective film installation portion 512 is formed in a substantially columnar form, and a reflective film installation surface 512A is provided on a surface (a projection tip end surface) that faces the movable substrate 52. In addition, since the reflective film installation portion 512 is formed projecting to the movable substrate 52 side from the electrode disposition groove 511, the reflective film installation surface 512A is in a position that is closer to the movable substrate 52 than the fixed electrode surface 511A. Accordingly, when the distance between the fixed electrode 561 and the movable electrode 562 is set as an electrode gap G2, the electrode gap G2 is configured by a dimension that is greater than that of the reflective film gap G1.

The fixed reflective film 54 is provided on the reflective film installation surface 512A facing the movable reflective film 55. A silver or silver alloy film may be suitable as the fixed reflective film 54 and the movable reflective film 55. Silver or silver alloy films have high reflection characteristics over a broad wavelength range from the visible light region to the near-infrared region. Accordingly, as a result of using a silver or silver alloy film in the fixed reflective film 54 and the movable reflective film 55, it is possible to selectively take out light of a desired target wavelength from a broad target wavelength range.

More specifically, the silver or silver alloy film of the fixed reflective film 54 is formed by removing unnecessary sections using an etching process after forming a film using an existing sputtering technique, or the like. It is preferable that the thickness of the silver or silver alloy film of the fixed reflective film 54 be set to 10 nm or more and 60 nm or less. These values are based on the results of optical characteristic simulations carried out by the present inventors, the accuracy of the silver or silver alloy film increases with the thickness thereof, and therefore, it is unlikely that transformation will occur. As a result of setting the thickness of the silver or silver alloy film to be in the above-mentioned range, in addition to ensuring accuracy of the film, it is possible to provide the required light transmissive property in a reflective film for a wavelength variable interference filter.

In this instance, in the present embodiment, a silver alloy that includes minute amounts of samarium, copper, bismuth, neodymium, and the like, is used as the fixed reflective film 54.

In addition, since it is easy for the silver atoms of a thin film of silver or silver alloy to move, there are cases in which cohesion is caused as a result and transformation occurs in the film. Therefore, a protective film 541 is provided on the outer surface of the fixed reflective film 54. It is sufficient as long as a material having a conductive property and a light transmissive property, and through which it is unlikely that molecules such as oxygen and water will be transmitted, is used as the protective film 541, and the material is not particularly limited. For example, it is possible to use a stacked film composed of a film including at least one type selected from the group consisting of an indium-based oxide, a tin-based oxide, and a zinc-based oxide. More specifically, examples of the indium-based oxide include indium gallium oxide (InGaO), indium tin oxide (Sn-doped indium oxide: ITO), cerium-doped indium oxide (ICO), examples of the tin-based oxide include tin-based oxide ($SnO_2$), examples of the zinc-based oxide include aluminum-doped zinc oxide (AZO), gallium-doped zinc oxide (GZO), zinc oxide (ZnO), and the like. In addition, it is also possible to use an indium zinc oxide (IZO: registered trademark) composed of an indium-based oxide and a zinc-based oxide. Films having these substances as materials are referred to as transparent conductive films, and are provided with a light transmissive property and a conductive property.

The above-mentioned materials have an effect of suppressing the transmission of gases caused by oxidation, sulfurization, or the like, and as a result of having a heat resistant property and a light transmissive property, are suitable as protective films of reflective films. In addition, these materials have an adhesive property with silver and silver alloys, and are also reliable as optical films. Among these materials, InGaO is stable since it is unlikely to react with silver, and therefore, is suitable as a protective film. Furthermore, InGaO has a high transmittance of roughly 80% or more in the visible light region, and a conductivity of 0.001 Ω·cm or less. Therefore, in the present embodiment, InGaO is used as the material of the protective film 541. Additionally, to explain in more detail, the InGaO film as the protective film 541 is formed by removing unnecessary sections using an etching process after forming a film using an existing sputtering technique, or the like.

Movable Substrate

For example, the movable substrate 52 is formed by carrying out an etching process on a quartz substrate made from a quartz glass that is prepared so that the thickness thereof is 600 μm. The same method as that of the above-mentioned fixed substrate 51 is used as the method of the processing.

The movable portion 521, which is provided in the movable substrate 52, is formed so that the thickness thereof is greater than that of the holding portion 522, and is formed to the same dimensions as those of the thickness of the movable substrate 52. In addition, the movable portion 521 includes a facing surface 52A as a surface that faces the fixed substrate 51. The movable reflective film 55, which faces the fixed reflective film 54 with an interval of the reflective film gap G1 therebetween, and the movable electrode 562, which faces the fixed electrode 561 with an interval of the electrode gap G2 therebetween, are provided on the facing surface 52A. In addition, an outer side surface 52B is provided in the movable substrate 52 on a side that is opposite to the facing surface 52A. The outer side surface 52B configures a similar optical surface to the outer side surface 51B of the fixed substrate 51.

The movable reflective film 55 is formed with a similar method to that of the fixed reflective film 54 using a similar silver alloy to that of the above-mentioned fixed reflective film 54. In addition, a protective film 551 is provided on the outer surface of the movable reflective film 55 in a similar manner to the manner in which the protective film 541 is provided on the outer surface of the fixed reflective film 54. The protective film 551 is formed with a similar method to that of the protective film 541 using InGaO in a similar manner to that of the above-mentioned protective film 541.

The holding portion 522, the thickness of which is less than that of the movable portion 521, and which configures a diaphragm that surrounds the periphery of the movable portion 521. Therefore, it is easier for the holding portion 522 to become warped than it is for the movable portion 521, and therefore, it is possible to displace the movable portion 521 to the fixed substrate 51 side using a minute electrostatic attractive force. In a state in which the movable portion 521 is displaced in this manner, since the rigidity of the movable portion 521, which is thick, is superior to the rigidity of the holding portion 522, changes in the shape of the movable portion 521 are suppressed even if the holding portion 522 becomes warped. Accordingly, even in the movable reflective film 55, which is provided in the movable portion 521, it is unlikely that warping will occur, and therefore, the fixed reflective film 54 and the movable reflective film 55, which configure the pair of reflective films, have a configuration in which a substantially parallel state is constantly retained. In this instance, in the present embodiment, the holding portion 522 has a diaphragm form, but is not limited to this configuration. For example, a configuration in which beam form holding portions that are disposed at equiangular intervals with the planar surface center point O set as the center thereof, may also be used.

A substrate outer peripheral portion 525 is disposed on the outer side of the holding portion 522. The second joining surface 523 is provided on a surface on which the substrate outer peripheral portion 525 faces the fixed substrate 51. In the above-mentioned manner, the second joining surface 523 is joined to the first joining surface 513 of the fixed substrate 51 using the joining film 53.

Planar Surface Disposition Fixed Substrate and Movable Substrate

As shown in FIG. 1, in the filter planar view of the fixed substrate 51, the electrode disposition groove 511 is configured to have a larger diameter dimension than the reflective film installation portion 512. In addition, a wiring groove (not illustrated in the drawings), which allows communication from the electrode disposition groove 511 up to the edge C3-C4 of the fixed substrate 51, is provided on the facing surface 51A. In addition, the fixed electrode 561 is provided in an annular form with the planar surface center point O as the substantial center thereof. A toric form or a shape in which a lead-out electrode protrudes from a portion thereof, a shape in which a portion is notched, a shape in which a portion is segmented, or the like, may be included as this annular shape.

A fixed lead-out electrode 563 is provided in one portion of the outer peripheral edge of the fixed electrode 561. The fixed lead-out electrode 563 is lead out along the wiring groove, which is provided from the electrode disposition groove 511 toward the edge C3-C4. Furthermore, a bump portion 565A, which is provided protruding toward the movable substrate 52 side, is provided in the wiring groove, and the fixed lead-out electrode 563 reaches up to the bump portion 565A. Furthermore, in addition to the bump portion 565A, the fixed lead-out electrode 563 abuts against and is electrically connected to a fixed connection electrode 565, which is provided on the movable substrate 52. The fixed connection electrode 565 extends from a region that faces the wiring groove up to the electrical surface 524, and configures a fixed electrode pad 565P on the electrical surface 524.

In this instance, it is possible to use an indium tin oxide (Sn-doped indium oxide: ITO), a thin film stacked body of titanium tungsten and gold, a thin film stacked body of chromium and gold, or the like, as the electrode materials of the fixed electrode 561 and the fixed lead-out electrode 563. For example, the fixed electrode 561 and the fixed lead-out electrode 563 are patterned as electrodes or wiring by etching after being formed using a vapor deposition technique, a sputtering technique, or the like.

In the filter planar view of the movable substrate 52, the movable portion 521 is formed in a substantially circular form having a diameter dimension that is greater than the diameter dimension of the outer peripheral edge of at least the reflective film installation portion 512. In addition, the movable electrode 562 is formed in an annular form, which forms substantially the same shape as that of the fixed electrode 561. In the above-mentioned manner, the movable electrode 562 configures the electrostatic actuator 56 together with the fixed electrode 561.

Furthermore, a movable lead-out electrode 564, which is connected to the outer peripheral edge of the movable electrode 562, is provided on the movable substrate 52. The movable lead-out electrode 564 is provided throughout the entirety of the electrical surface 524 along a region that faces the wiring groove from the movable portion 521, and configures a movable electrode pad 564P on the electrical surface 524. In addition, in the above-mentioned manner, the fixed connection electrode 565, which is provided on the movable substrate 52, is connected to the fixed lead-out electrode 563 via the bump portion 565A. A similar method to that of the above-mentioned fixed substrate 51 is used in the formation of the electrodes and the wiring such as the movable electrode 562 and the movable lead-out electrode 564.

Hydroxyl Group Concentration of Quartz Substrate

In the above-mentioned manner, the fixed substrate and the movable substrate 52 are configured by quartz substrates that are capable of transmitting light. The concentration of hydroxyl groups that are included in the quartz substrates is set to be 500 ppm or less, or 1000 ppm or more. More preferably, the concentration is set to 100 ppm or less, or 1000 ppm or more. In the present embodiment, quartz substrates in which the above-mentioned concentration of hydroxyl groups is 100 ppm or less, or 1000 ppm or more, are used. The above-mentioned concentration ranges are based on experimental results of the present inventors, and as a result of using a quartz substrate, it is easy to set the above-mentioned concentration ranges. The experimental results will be described in detail in examples, which will be mentioned later. Additionally, in the invention, ppm as the unit of concentration is referred to as mass ppm.

In this instance, it is possible to determine the concentration of hydroxyl groups that are included in the quartz substrate using an infrared spectroscopic technique. Hereinafter, the method will be described.

An infrared spectrophotometer is used in the infrared spectroscopic technique. A Fourier Transform Infrared Spectroscopy (FT-IR: A Fourier Transform Infrared spectrophotometer) is generally used as an infrared spectrophotometer. It is possible to calculate the concentration of hydroxyl groups from the height of a hydroxyl group-derived absorption peak of a specific wave number in an infrared ray absorption spectrum of a quartz substrate obtained using FT-IR.

Firstly, the interior of an FT-IR sample chamber is sufficiently substituted with dry nitrogen (a nitrogen purge). The nitrogen purge has an aim of reducing the effect of the water content that is included in atmospheric air in the infrared ray optical path inside the device. Accordingly, the above-mentioned nitrogen purging is also continued during measurement.

Subsequently, a quartz substrate, as a sample, is installed in the sample chamber along an FT-IR infrared ray irradiation optical path. Thereafter, transmission measurement is implemented after performing the above-mentioned nitrogen purge. More specifically, measurement is performed by irradiating an optical path with infrared rays, and receiving transmitted light, which is transmitted by the quartz substrate, using a detector. As a result of this, an infrared ray absorption spectrum is obtained. In this instance, a blank infrared ray absorption spectrum, for which measurement is performed without installing a sample, is subtracted from the above-mentioned measured infrared ray absorption spectrum, and the result is set as the infrared ray absorption spectrum of the quartz substrate. The reason for this is to eliminate an amount corresponding to hydroxyl groups derived from minute amounts of water in the atmospheric air that remain even after a nitrogen purge.

Next, in the obtained infrared ray absorption spectrum of the quartz substrate, the height (the absorbance) of an absorption peak of O—H expansion and contraction emerges in the vicinity of the 3600 cm$^{-1}$ and is derived from hydroxyl groups, is determined. In this instance, if the peak height is set as A, the concentration of hydroxyl groups is set as C (unit: ppm), the thickness dimension of the quartz substrate is set as L (cm), a molar absorption coefficient is set as ε (uni: l/mol·cm), the atomic weight of hydrogen is set as $M_H$, the atomic weight of oxygen is set as $M_O$, and the density of the quartz substrate is set as ρ, the equation $C=A/(L \times \varepsilon) \times (M_O+M_H)/\rho \times 10^3$ is established. In the above-mentioned equation, the concentration C of hydroxyl groups is obtained by substituting in ε=77.5, $M_O$=16, $M_H$=1, ρ=2.2, and the numerical values of A and L.

In the present embodiment, a quartz glass manufactured using a direct contact technique or a suit technique vapor axial-phase deposition (VAD) method, which is classified as a gas phase synthesis technique, is used. In general, the concentration of hydroxyl groups in a quartz glass manufactured using a direct contact technique is roughly 500 ppm or more, and is roughly 200 ppm or less in a VAD technique.

Evaluation of Silver Alloy Reflective Film

Next, an evaluation method of the occurrence of transformation (bulging) in a silver alloy reflective film that is used as the fixed reflective film 54 and the movable reflective film 55, will be described. Additionally, in the evaluation, since transformation of the reflective film that is formed on the outer surface of the quartz substrate is confirmed, evaluation is performed with a single quartz substrate as a test piece without incorporating a wavelength variable interference filter.

Firstly, in the above-mentioned method, as a reflective film, a silver alloy is formed into a film having a thickness of 26.6 nm on the outer surface of a quartz substrate using a quartz substrate in which the concentration of hydroxyl groups is 1039 ppm. Furthermore, a protective film is formed by stacking InGaO on the outer surface of the reflective film.

Subsequently, a thermal load is applied to the quartz substrate in a vacuum for three hours at 280° C. Thereafter, minute bulges in the outer surface of the silver alloy film are observed using a scanning electron microscope. More specifically, an image of the outer surface of the silver alloy film is captured, and contrast adjustment is carried out on the image. As a result of this, the above-mentioned bulges are displayed as luminous dots. In such an instance, in a captured image, the luminous dots (the above-mentioned bulges) in a region that corresponds to a surface area of 0.01 mm$^2$ of the quartz substrate are counted using image analysis. As a result of this, the number of occurrences of bulges on the outer surface of the silver alloy film was 0 in the quartz substrate. In this instance, in order to ensure reliability of a wavelength variable interference filter, it is necessary for the number of occurrences of bulges in the above-mentioned evaluation to be 0.

Hereinafter, examples and comparative examples are shown for quartz substrates relating to wavelength variable interference filters of the present embodiment, and the results of the present embodiment will be described more specifically.

Preparation of Quartz Substrates and Reflective Films

FIG. 3 is a table that shows conditions such as the concentration of hydroxyl groups and the number of bulges in a reflective film in quartz substrates of examples and comparative examples.

The concentration of hydroxyl groups was calculated for the quartz substrates of each example and each comparative example by determining the peak height of the hydroxyl groups using the above-mentioned method. The hydroxyl group concentration was divided into the 100 ppm or less of Example 1 to Example 4, the 1000 ppm or more of Example 5 to Example 8, the more than 500 ppm and less than 1000 ppm of Comparative Example 1 to Comparative Example 6. In this instance, regarding the quartz glass used in the quartz substrates, Example 1 to Example 4 used quartz glass manufactured with the suit technique (the VDA technique), and Example 5 to Example 8 and Comparative Example 1 to Comparative Example 6 used quartz glass manufactured with the direct contact technique.

Subsequently, silver alloy reflective films having the same configuration as that of the above-mentioned embodiment were formed using the quartz substrates of each example and each comparative example. In addition, the protective films were also formed by stacking InGaO in the same manner as that of the above-mentioned embodiment. Additionally, evaluation was also performed for the examples and comparative example using a single quartz substrate as a test piece in the same manner as the above-mentioned embodiment.

Evaluation of Reflective Films

Figure 4:
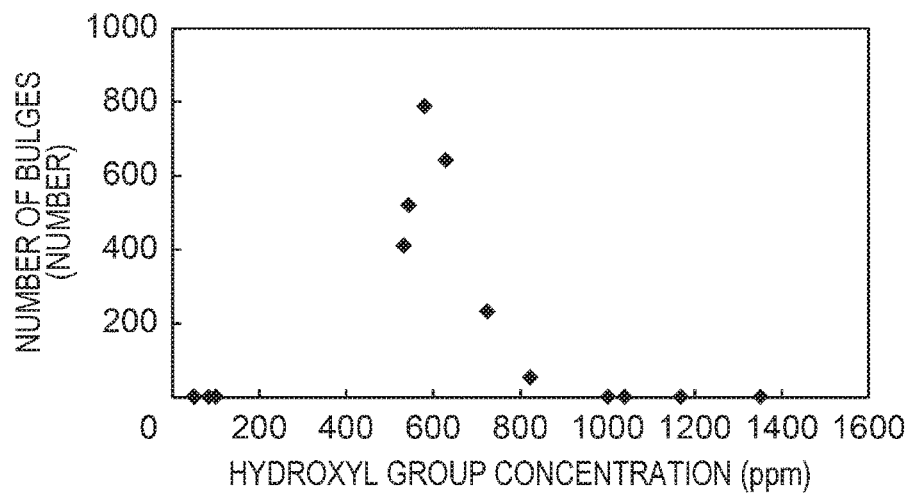
FIG. 4 is a graph that shows a relationship between the hydroxyl group concentration and the number of bulges.

The number of bulges on the outer surface of the reflective film was examined by applying a thermal load in the same manner as the above-mentioned embodiment for the reflective film of each example and each comparative example. The results are shown in FIG. 3. In addition, FIG. 4 is a graph that shows a relationship between concentration of hydroxyl groups and the number of bulges. In the graph of FIG. 4, the concentration of hydroxyl groups is plotted on the horizontal axis and the number of bulges is plotted on the vertical axis for the data of each example and each comparative example shown in the table of FIG. 3.

As shown in FIG. 3, the occurrence of bulge was 0 for all of the reflective films formed on the quartz substrates of Example 1 to Example 8, and it can be understood that the occurrence of bulges is suppressed. In contrast to this, a large number of bulge occurred in all of the reflective films formed on the quartz substrates of Comparative Example 1 to Comparative Example 6, and inferior reliability is shown.

In addition, as shown in FIG. 4, the occurrence of bulges was not observed in ranges of the examples in which the concentration of hydroxyl groups is 100 ppm or less, or 1000 ppm or more. In contrast to this, a maximum of close to 800 bulges occurred in a range of the comparative examples in which the concentration of hydroxyl groups exceeds 500 ppm but is less than 1000 ppm. In this manner, it is shown that transformation is suppressed in the quartz substrates according to the examples, and that the reliability as a wavelength variable interference filter is improved.

In this instance, as long as the concentration of hydroxyl groups of the quartz substrates is 100 ppm or less or 1000 ppm or more, transformation of the film of silver alloy is suppressed, and therefore, a mechanism by which the occurrence of bulges is suppressed, is observed.

It is thought that the silver alloy has a tendency to cohere (a cohesive property), which silver itself has, and an action in which additive elements in the silver alloy suppress cohesion (a suppressive property). Therefore, the tendency for bulges to occur is determined depending on strengths of the cohesive property and the suppressive property, and furthermore, it is assumed that the hydroxyl group concentration of the quartz substrate has an effect on this. The detailed causal relationship is still being investigated, but an effect of the cohesive property being reduced when the hydroxyl group concentration is 100 ppm or less, and the suppressive property being enhanced when the hydroxyl group concentration is 1000 ppm or more, is assumed.

In the abovementioned manner, according to the wavelength variable interference filter of the present embodiment, it is possible to obtain the following effects.

According to the wavelength variable interference filter of the present embodiment, it is possible to provide a wavelength variable interference filter in which the occurrence of bulge in the outer surface of a silver alloy reflective film is suppressed, in which it is possible to retain the optical characteristics such as wavelength resolution, and quality, and in which the reliability is improved. To explain in more detail, in the related art, there is a concern that bulges will occur in the outer surface of a silver or silver alloy reflective film, but according to the present embodiment, the cohesion of silver in a reflective film is suppressed by setting the hydroxyl group concentration of a quartz substrate to a predetermined range. Therefore, it is unlikely that the reflective film will be subjected to the effects of a thermal load or the passage of time, and therefore, transformation of the silver alloy is suppressed and the generation of the abovementioned bulges is suppressed. As a result of this, it is unlikely that the reflectance and the profile irregularity of the reflective film of the wavelength variable interference filter will change, and therefore, it is possible to preserve the wavelength resolution over a long period of time.

In addition, as a result of setting the thickness of the silver alloy film of the reflective film to a predetermined range, in addition to ensuring the required transmittance in a reflective film, it is possible to configure an elaborate film. As a result of this, the protection of an interface between the reflective film and the quartz substrate is enhanced, and therefore, it is possible to further suppress the generation of bulges.

Furthermore, as a result of covering the silver alloy reflective film with an InGaO protective film, the protection of the reflective film is enhanced, and therefore, discoloration and transformation are reduced. As a result of this, the durability of the reflective film is further improved, and therefore, the reliability of the wavelength variable interference filter is further enhanced.

Embodiment 2

Configuration of Electronic Component

Figure 5:
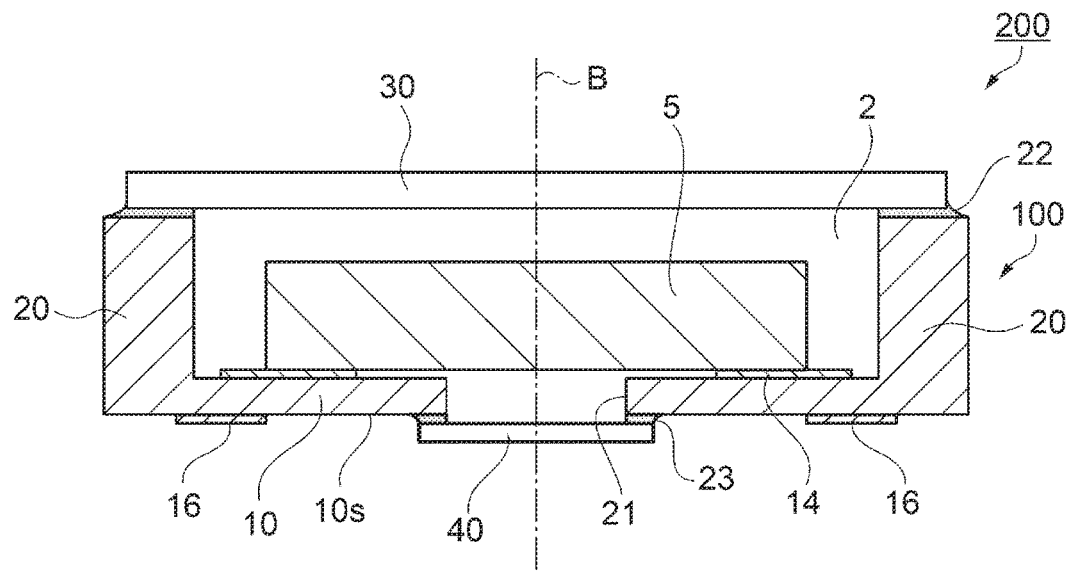
FIG. 5 is a cross-sectional view that shows a schematic configuration of an electronic component according to Embodiment 2.

A outline configuration of an electronic component according to the present embodiment will be described with reference to FIG. 5. FIG. 5 is a cross-sectional view that shows a schematic configuration of an electronic component provided with a wavelength variable interference filter. Additionally, constituent sites that are the same as those of Embodiment 1 will be given the same reference numerals, and overlapping descriptions thereof will be omitted.

An electronic component 200 shown in FIG. 5 includes a package for accommodation 100 as a base substrate, a first lid portion 30, a joining member 22, the wavelength variable interference filter 5, and an accommodation portion 2. In other words, the electronic component 200 is an optical filter device in which the wavelength variable interference filter 5 is mounted in the accommodation portion 2 of the inner portion thereof. The electronic component 200 has a function of taking out and emitting light of a desired wavelength from light that is incident thereto using the built-in wavelength variable interference filter 5.

The package for accommodation 100 is provided with the accommodation portion 2 that accommodates the wavelength variable interference filter 5, a base portion 10, a side wall portion 20, the first lid portion 30, an opening portion 21, a second lid portion 40, and the like.

The circular opening portion 21, which transmits light, is formed in the base portion 10 in a region that faces the wavelength variable interference filter 5. Additionally, the shape of the opening portion 21 is not limited to circular, and may be triangular, rectangular, polygonal, elliptical, or the like, or a shape in which such shapes are combined.

The shape of the electronic component 200 is a rectangular parallelepiped. In addition, the planar shapes of the base portion 10 and the first lid portion 30 are set as substantially rectangular.

An external connection terminal 16 is provided on an outer side surface 10s (a surface on a side that is opposite to the surface on which the wavelength variable interference filter 5 is mounted) of the base portion 10. In addition, a conductive pattern 14 is provided on the surface of the base portion 10 on which the wavelength variable interference filter 5 is mounted. The conductive pattern 14 and the external connection terminal 16 are electrically connected to by a wiring pattern (not illustrated in the drawings) formed in the inner portion of the base portion 10.

The conductive pattern 14 is electrically connected to the fixed electrode pad 565P and the movable electrode pad 564P of the wavelength variable interference filter 5 (refer to FIG. 1). For example, a flexible printed circuit (FPC) is applicable in such connections, and it is possible to use a silver paste, an anisotropic conductive film (ACF), or the like. Among these, it is preferable to use a silver paste in which the out-gas component is low. In addition, a wiring connection as a result of wire bonding, for example, without using a connection as a result of FPC may also be used.

The side wall portion 20 is a frame form body that configures a side wall portion of the accommodation portion 2, and, for example, is configuration by a stacked ceramic substrate. The side wall portion 20 is formed in an integral manner with the base portion 10 so as to be stacked on the base portion 10.

The first lid portion 30 is a glass substrate that configures a top portion of the accommodation portion 2, which faces a bottom portion thereof. The first lid portion 30 is joined to the side wall portion 20 using the joining member 22 in a manner that covers the accommodation portion 2, and hermetically seals the top portion of the accommodation portion 2. In addition, the second lid portion 40 is a glass substrate that covers the opening portion 21 from the outer side of the accommodation portion 2. The second lid portion 40 is joined to the outer side surface 10s of the base portion 10, which forms the opening portion 21, using a joining member 23 and hermetically seals the opening portion 21.

In other words, the accommodation portion 2 forms a cavity portion that is surrounded by the base portion 10, the side wall portion 20, the first lid portion 30, and the second lid portion 40. As a result of this, a hermetic state is maintained in the accommodation portion 2 by the first lid portion 30 and the second lid portion 40.

In this instance, examples of the joining method using the joining members 22 and 23 include low melting point glass bonding, glass frit bonding, glass sealing, brazing, and the like, and among these, it is preferable to use a low melting point glass (a glass paste). The glass paste is a substance that has been configured in a paste form by adding a liquid to a low melting point glass, and it is possible to perform joining by heating to a temperature that exceeds the glass transition point of the low melting point glass. Since it is possible to perform joining at a low temperature in comparison with other joining members, the glass paste is suitable for the present embodiment.

When a straight line that passes through the planar surface center of the opening portion 21 and is substantially perpendicular to the base portion 10, is set as a straight line B, the substantial planar surface center of the first lid portion 30 and the second lid portion 40 is disposed on the straight line B. In addition, the planar surface center point O of the wavelength variable interference filter 5 is also configured to be positioned on the straight line B. As a result of the above-mentioned disposition, light is incident from the first lid portion 30, and light of a predetermined wavelength that is taken out by the wavelength variable interference filter 5 is emitted from the second lid portion 40.

In addition, the first lid portion 30 and the second lid portion 40 are not limited to glass substrates, and depending on the wavelength of light to be transmitted, quartz, silicon, germanium, or the like, may also be used.

Additionally, the external form dimensions of the electronic component 200 are not particularly limited, but for example, are of an extent at which an end edge of the planar surface rectangle of the base portion 10 exceeds 10 mm.

Manufacturing Method of Electronic Component

Figure 6A:
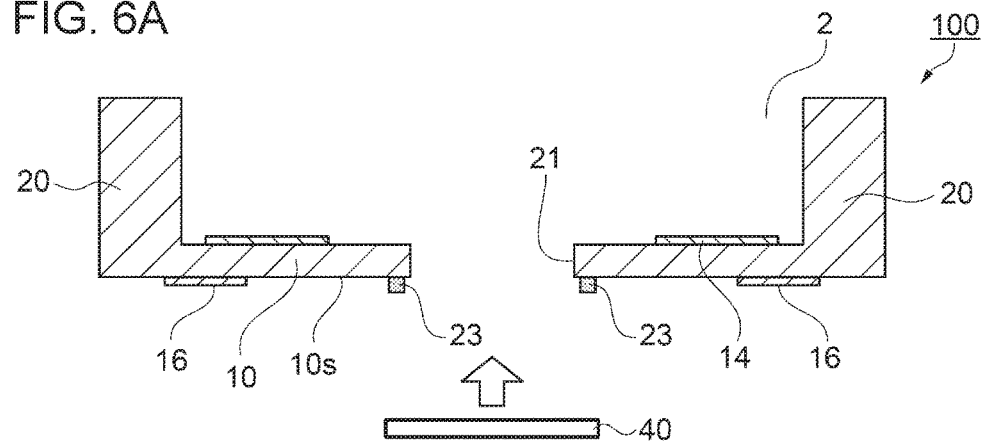
FIG. 6A is a schematic cross-sectional view that shows a manufacturing method of the electronic component.
Figure 6B:
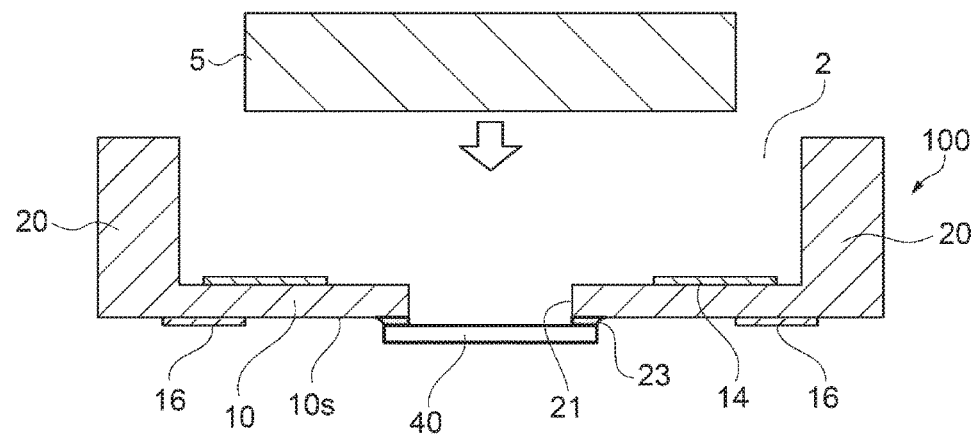
FIG. 6B is a schematic cross-sectional view that shows a manufacturing method of the electronic component.
Figure 6C:
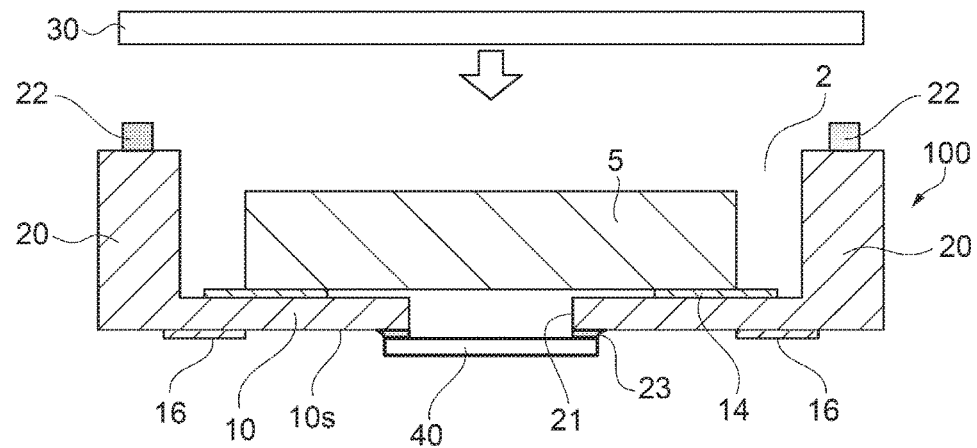
FIG. 6C is a schematic cross-sectional view that shows a manufacturing method of the electronic component.

A manufacturing method of an electronic component provided with a wavelength variable interference filter will be described with reference to FIGS. 6A to 6C. FIGS. 6A to 6C are schematic cross-sectional views that show the manufacturing method of the electronic component.

The manufacturing method of the electronic component 200 of the present embodiment includes configuring a housing of the electronic component 200 by disposing the package for accommodation 100 and the first lid portion 30, and hermetic sealing the package for accommodation 100 by heating the joining member 22.

Firstly, the conductive pattern 14 and the external connection terminal 16 are formed in the package for accommodation 100. In addition, the first lid portion 30 and the second lid portion 40 are prepared through cutting to a predetermined size. Subsequently, as shown in FIG. 6A, the periphery of the opening portion 21 of the outer side surface 10s is coated with a glass paste (a low melting point glass) as the joining member 23. The glass paste is spread as a result of compression bonding the second lid portion 40 to the coated glass paste, and temporary joining is performed by aligning the second lid portion 40 and the outer side surface 10s. Thereafter, the second lid portion 40 and the outer side surface 10s are joined by firing through heating the temporarily joined glass paste to a temperature that exceeds the glass transition point of the low melting point glass.

Next, as shown in FIG. 6B, the wavelength variable interference filter 5 is accommodated and mounted in the accommodation portion 2. At this time, the wavelength variable interference filter 5 is installed by electrically connecting the fixed electrode pad 565P and the movable electrode pad 564P (refer to FIG. 1), as external terminals of the wavelength variable interference filter 5, and the conductive pattern 14. In addition, in conjunction with this, the wavelength variable interference filter 5 may be fixed to the package for accommodation 100 using an adhesive, or the like.

Next, as shown in FIG. 6C, a joining location of the side wall portion 20 and the first lid portion 30 is coated with a glass paste (a low melting point glass), as the joining member 22. The glass paste is spread as a result of compression bonding the first lid portion 30 to the coated glass paste, and temporary joining is performed by aligning the first lid portion 30 and the side wall portion 20. Thereafter, the first lid portion 30 and the side wall portion 20 are joined and hermetically sealed by firing through heating the temporarily joined glass paste to a temperature that exceeds the glass transition point of the low melting point glass. At this time, heat that is close to the above-mentioned temperature is also applied to the wavelength variable interference filter 5.

In this instance, in the above-mentioned process (the joining), it is easy for transformation (minute bulging) to occur in the silver or silver alloy reflective films of the related art as a result of a thermal load being applied. According to the invention, even if a thermal load is applied, it is possible to suppress the occurrence of bulges in the silver alloy reflective film.

By carrying out the above-mentioned processes, the wavelength variable interference filter 5 is hermetically sealed to the outside, and the electronic component 200 shown in FIG. 5 is manufactured.

Additionally, the manufacturing method of the electronic component 200 is not limited to the above-mentioned process. The order of each process may be reversed, and the two processes may be implemented in parallel. For example, the processes that perform firing of the glass pastes may merged, and heating of the joining member 22 and the joining member 23 may be implemented simultaneously.

In the above-mentioned manner, according to the present embodiment, in addition to the effects of Embodiment 1, it is possible to obtain the following effects.

According to the present embodiment, since the wavelength variable interference filter 5 is hermetically sealed in the inner portion of the electronic component 200, the optical characteristics and the quality of the wavelength variable interference filter 5 are retained, and therefore, it is possible to provide an electronic component 200 having improved reliability. To explain in more detail, as a result of hermetic sealing, the wavelength variable interference filter 5 is shut off from the outside, and therefore, it is unlikely that the wavelength variable interference filter 5 will be subjected to the effects of water, oxygen, and the like. Therefore, in the wavelength variable interference filter 5, the cohesion of silver of the reflective films is suppressed, and moreover, the reliability is improved as a result of the formation of the protective film. Furthermore, the occurrence of bulges in the reflective films is also suppressed for a thermal load that is applied during manufacturing of the electronic component 200. As a result of this, it is also possible to improve the reliability as the electronic component 200.

In addition, since a low melting point glass is used in the hermetic sealing of the electronic component 200, it is possible to perform joining at a comparatively low temperature in comparison with glass joining or brazing. Therefore, in the joining, the thermal load that is applied to the wavelength variable interference filter 5 is reduced, and therefore, transformation of the silver alloy reflective film is suppressed. As a result of this, it is possible to provide an electronic component and a manufacturing method of an electronic component having improved reliability.

Embodiment 3

Configuration of Printer

Figure 7:
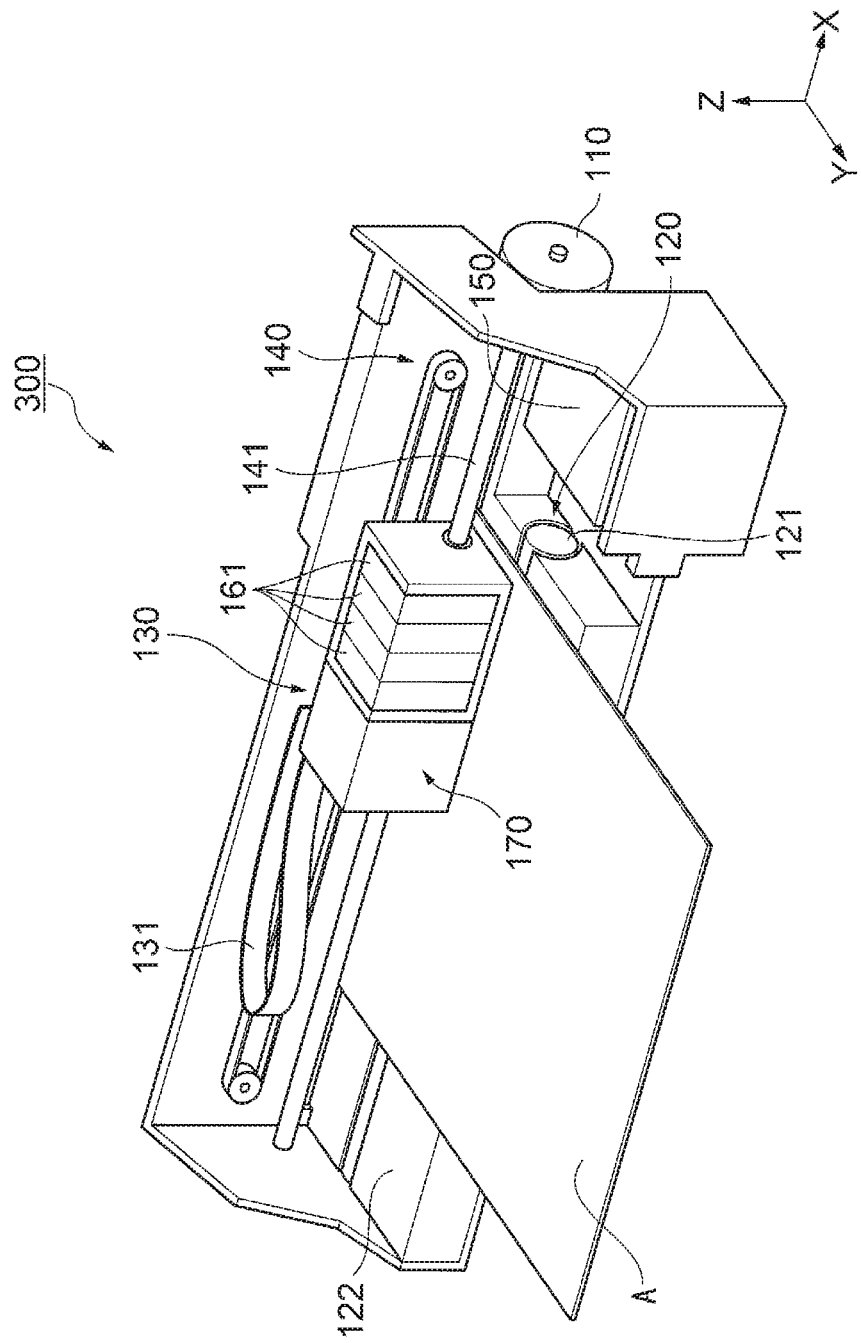
FIG. 7 is a perspective view that shows a schematic configuration of a printer according to Embodiment 3.

Next, an electronic apparatus provided with the wavelength variable interference filter 5 will be described with reference to FIG. 7 using a printer as an example. FIG. 7 is a perspective view that shows a schematic configuration of a printer.

A printer 300 shown in FIG. 7 is an ink jet printer. An ink jet printer is an electronic apparatus that prints images, and the like, by discharging liquid droplets of an ink onto a target printing object.

The printer 300 includes a transport unit 120, a carriage 130, a carriage movement unit 140, a spectroscope 170, a control unit 150, and the like. The spectroscope 170 is installed in the carriage 130, and includes the electronic component 200 in which the wavelength variable interference filter 5 is mounted in the inner portion. Accordingly, as a result of being provided with the spectroscope 170, the printer 300 has a function of performing spectroscopic measurement of the color tone of a printing portion in which printing is implemented. Furthermore, the printer 300 also has a function of correcting to a desired color tone by analyzing measured color tone data.

A head unit (not illustrated in the drawings) is disposed on the bottom surface of the carriage 130 adjacent to the spectroscope 170. An ink is discharged as liquid droplets from a plurality of nozzles of the head unit. The head unit is disposed facing a medium A as a target printing object, and printing can be carried out by landing liquid droplets of the ink on the medium A. In addition, a plurality of ink cartridges 161 for supplying the ink to the head unit are mounted in the carriage 130. Different colors of the ink are individually accommodated in the ink cartridges 161, and it is possible to print a color image by discharging minute liquid droplets of the different colors. In addition, the ink cartridges 161 are removable from the carriage 130, and it is possible to replace ink cartridges 161 in which the residual amount of ink is depleted.

In addition, the carriage 130 is driven by the carriage movement unit 140, and a reciprocating motion on a carriage guide shaft 141 is possible. As a result of this, the head unit, which is installed on the bottom surface of the carriage 130, can also perform a reciprocating motion in a free manner.

The transport unit 120 is provided with a transport roller 121. The transport roller 121 has a function of transporting the medium A. More specifically, the transport roller 121 has functions of transporting a medium A that is supplied from a supply unit 110 on the back surface of the printer 300, on a platen 122, on which program is executed, and further transporting the medium A to the outer portion of the printer 300. In this instance, in FIG. 7, a transport direction of the medium A is defined as a Y axis direction, a direction that is substantially parallel to a reciprocating motion direction of the carriage 130 and is orthogonal to the Y axis direction is defined as an X axis direction, and an up-down direction of the printer 300 that is orthogonal to the X axis direction and the Y axis direction is defined as a Z direction.

The spectroscope 170 is disposed facing the platen 122 in a similar manner to that of the head unit. Accordingly, in a case in which measurement is implemented, the spectroscope 170 is positioned facing the medium A on the platen 122. Furthermore, due to the carriage movement unit 140 and the transport unit 120, the head unit and the spectroscope 170 can scan relatively in the X axis direction and the Y axis direction with respect to the medium A.

In addition, the control unit 150 is a control portion that controls the above-mentioned functions, and is electrically connected to the carriage 130 via wiring 131. Therefore, the control unit 150 and the carriage 130 have a configuration in which it is possible to perform communication of liquid droplet discharge information relating to the head unit, ink amount information relating to ink cartridges 161, color measurement information relating to the spectroscope 170, operation information of the carriage movement unit 140 and the transport unit 120, and the like. For example, it is possible to use a flexible flat cable (FFC) as the wiring 131.

Additionally, in the present embodiment, a so-called on-carriage type printer, in which the ink cartridges 161 are mounted in the carriage 130, is described as an example, but the invention is not limited to this configuration. For example, an off-carriage type in which the ink is supplied to the head unit using ink piping instead of an ink accommodation container being mounted in the carriage, may also be used.

In addition, examples of the ink that is used in the printer 300 include a water-based, a non-water-based, a reactive ink such as an ultraviolet ray curable type, and the like, and it is possible to select the ink to match the characteristics that are required in the medium A or the printing object.

Furthermore, for example, it is possible to use a piezoelectric element, an electromechanical conversion element, or an electrothermal conversion element as the liquid droplet discharging unit in the head unit.

Configuration of Spectroscope

Figure 8:
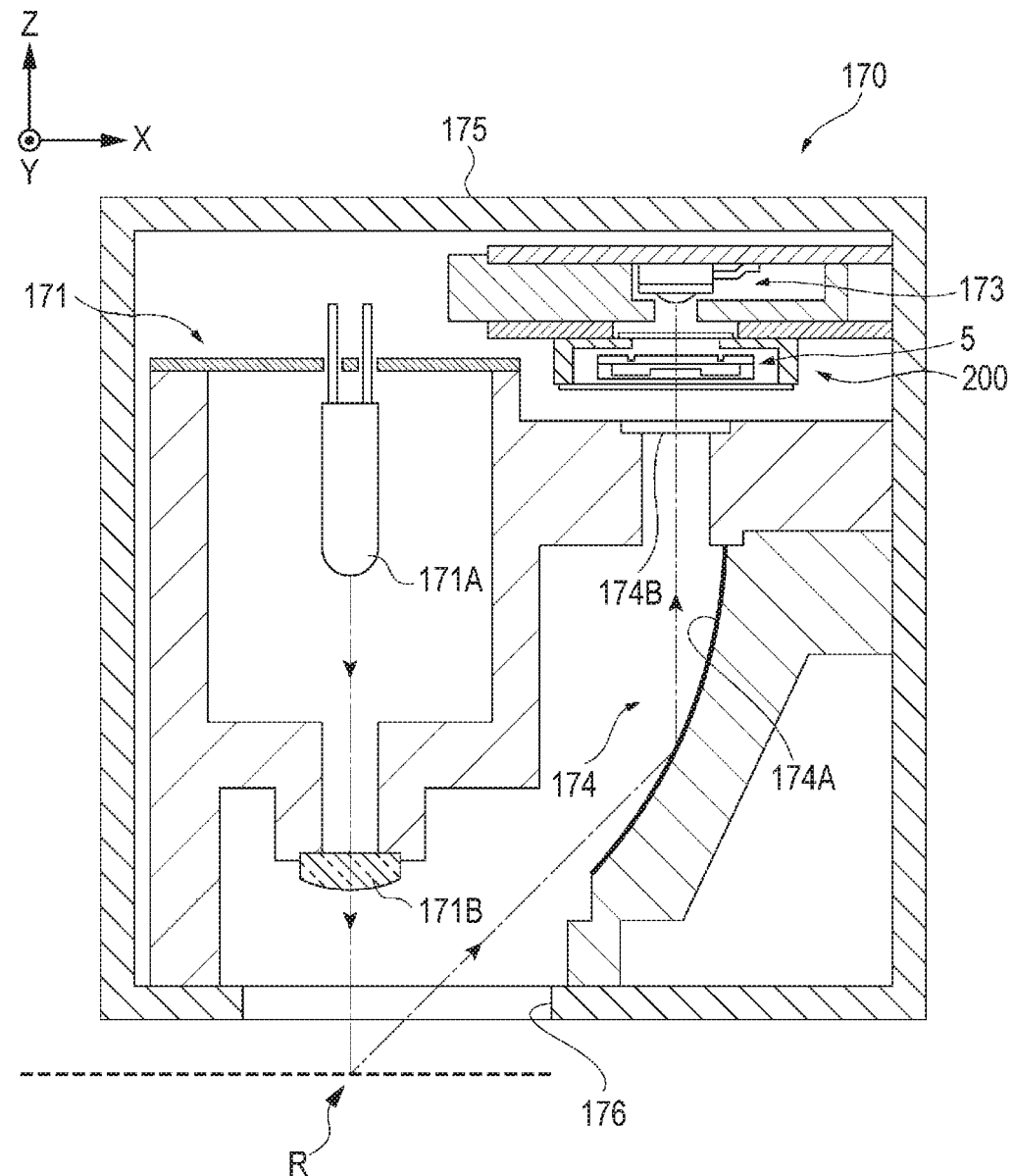
FIG. 8 is cross-sectional view that shows a schematic configuration of a spectroscope that is mounted in the printer.

Next, a configuration of a spectroscope will be described with reference to FIG. 8. FIG. 8 is a cross-sectional view that shows a schematic configuration of a spectroscope. Additionally, constituent sites that are the same as those of above-mentioned embodiments will be given the same reference numerals, and overlapping descriptions thereof will be omitted.

The spectroscope 170 shown in FIG. 8 includes a light source portion 171, the electronic component 200, a light reception portion 173, and a light guide portion 174, and these are accommodated in a housing 175. A measurement opening portion 176 is provided in the housing 175 facing a measurement position R as a printing portion on the medium A.

The spectroscope 170 irradiates the measurement position R with illumination light from the light source portion 171 through the measurement opening portion 176, and causes a light component (reflected light) that is reflected by the measurement position R to be incident to the electronic component 200 using the light guide portion 174. Subsequently, the electronic component 200 causes light of a predetermined wavelength from the above-mentioned reflected light to reach the light reception portion 173 as a result of emitting (transmitting) the light. In this instance, the electronic component 200 has a function of selecting a predetermined wavelength of light using the wavelength variable interference filter 5 that is mounted therein. Therefore, as a result of measuring the light quantity of each wavelength in the visible light region, it is possible to perform spectroscopic measurement of the measurement position R.

In this instance, in addition to a printing partition (hereinafter, referred to as a color patch) of a single color of each color of ink that is mounted in the printer 300, it is preferable that mixed color patches in which liquid droplets of two or more colors of ink are mixed and printed at predetermined ratios be included at the measurement position R. As a result of performing spectroscopic measurement of the mixed color patches, it is possible to correct printing profile data in detail.

The light source portion 171 includes a light source 171A and a light condensing portion 171B. The light source portion 171 irradiates the outer surface of the measurement position R on the medium A with light that is emitted from the light source 171A from a normal line direction (a Z axis direction).

In this instance, a light source that is capable of emitting light of each wavelength in the visible light region is preferable as the light source 171A, and examples of such a light source include a halogen lamp, a xenon lamp, a white light emitting diode, and the like. In particular, as the light source 171A a compact, lightweight white diode is suitable for being installed in the limited space inside the carriage 130.

For example, the light condensing portion 171B is configured by a condensing lens, or the like, and has a function of condensing the light emitted from the light source 171A onto the measurement position R. Additionally, in the present embodiment, the light condensing portion 171B is configured by a single condensing lens, but may also be configured by combining a plurality of lenses.

In the above-mentioned manner, the wavelength variable interference filter 5 is mounted in the inner portion of the electronic component 200. The external connection terminal 16 (refer to FIG. 5) to which the movable electrode pad 564P and the fixed electrode pad 565P of the wavelength variable interference filter 5 are connected, is electrically connected to the control unit 150 (refer to FIG. 7). Further, a predetermined voltage is applied to the electrostatic actuator 56 (refer to FIG. 2) of the wavelength variable interference filter 5 using an instruction signal from the control unit 150. As a result of this, according to the configuration, the distance of the reflective film gap G1 (refer to FIG. 2) of the wavelength variable interference filter 5 changes, and light of a predetermined wavelength is emitted.

The light reception portion 173 is disposed on an axis line (on the optical axis) of the planar surface center point O (refer to FIG. 1) of the wavelength variable interference filter 5, and receives light transmitted by the wavelength variable interference filter 5. The light reception portion 173 outputs a detection signal (a current value) that depends on the received light quantity as a result of the control of the control unit 150. In addition, the detection signal output by the light reception portion 173 is input to the control unit 150 through an I-V converter (not illustrated in the drawings), an amplifier (not illustrated in the drawings), and an AD converter (not illustrated in the drawings).

The light guide portion 174 includes a reflective mirror 174A and a band-pass filter 174B. The light guide portion 174 causes light reflected at the measurement position R at 45° to the outer surface of the medium A to be reflected on the optical axis of the wavelength variable interference filter 5 by the reflective mirror 174A. In addition, the band-pass filter 174B has a function of not transmitting ultraviolet rays and infrared rays, and transmitting light of the visible light region (for example, wavelengths from 380 nm to 720 nm). Therefore, the provided configuration selectively causes light of the visible light region to be incident to the wavelength variable interference filter 5, and light of the predetermined wavelength selected from the visible light region to be received in the light reception portion 173.

Configuration of Control Unit

Figure 9:
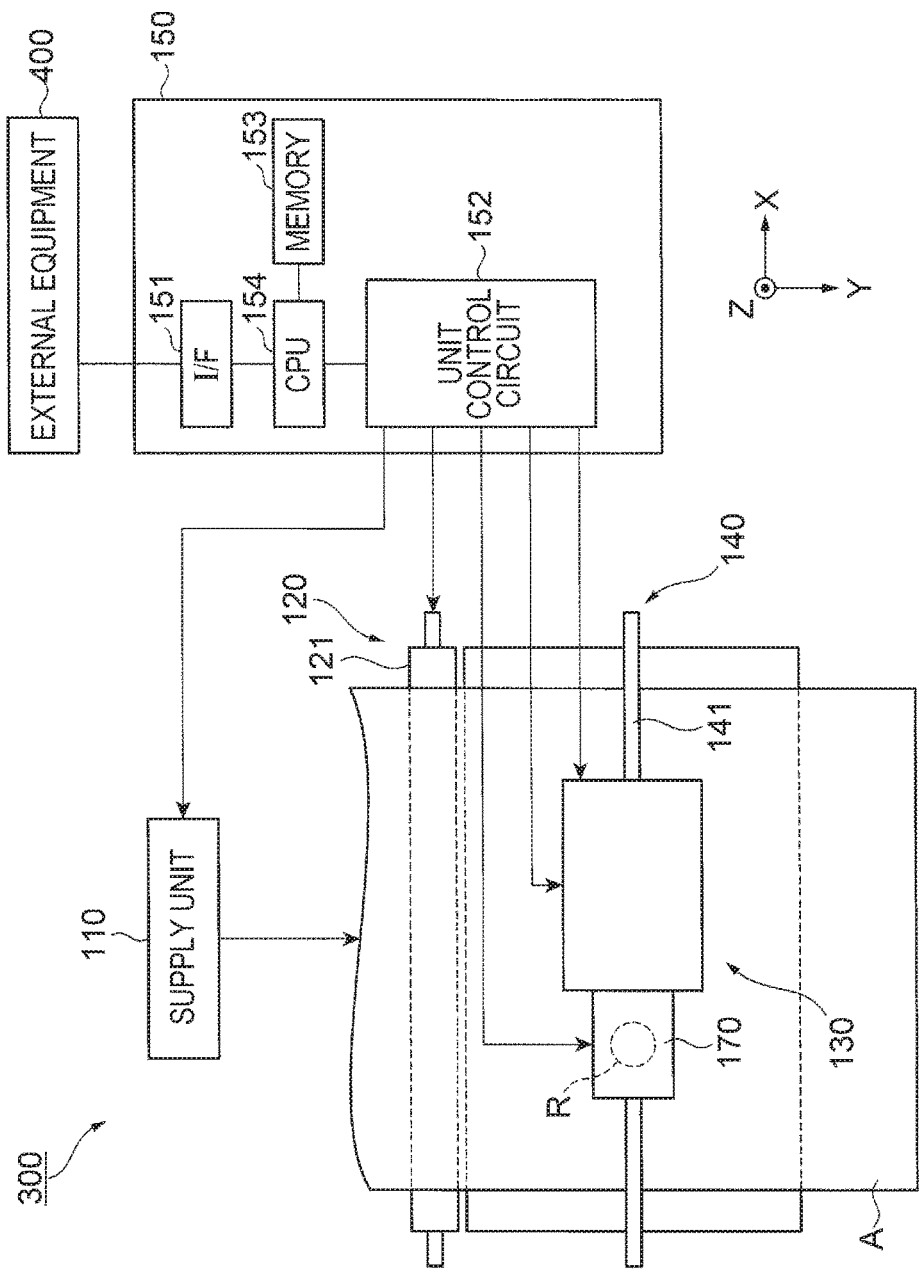
FIG. 9 is a block diagram that shows a schematic configuration of the printer.

Next, a control unit of a printer will be described with reference to FIG. 9. FIG. 9 is a block diagram that shows a schematic configuration of a printer.

As shown in FIG. 9, the printer 300 is electrically connected to the control unit 150 as a control portion. The control unit 150 includes an I/F 151, a unit control circuit 152, a memory 153, and a central processing unit (CPU) 154. In addition, the control unit 150 is connected to external equipment 400 such as a personal computer.

The I/F 151 inputs printing data input from the external equipment 400 to the CPU 154. The unit control circuit 152 includes control circuits that respectively control the supply unit 110, the transport unit 120, the head unit, the carriage movement unit 140, the light source 171A of the above-mentioned spectroscope 170, the electronic component 200, the light reception portion 173, and the like. The unit control circuit 152 controls the operations of each of the above-mentioned units using instruction signals from the CPU 154. Additionally, the control circuits of each unit may have a configuration that is provided separately from the control unit 150, but is connected to the control unit 150.

Various programs and various items of data that controls the operations of the printer 300 are stored in the memory 153. Examples of the various items of data include V-lambda data that shows the wavelength of transmitted light with respect to an application voltage to the electrostatic actuator 56 relating to the control of the wavelength variable interference filter 5, printing profile data that corresponds to a discharge amount of each ink with respect to color data included in the printing data, and the like. In addition, the data of luminescent characteristics (a light emission spectrum) for each wavelength of the light source 171A, light reception characteristics (light reception sensitivity characteristics) for each wavelength of the light reception portion 173 and the like, may also be stored.

The CPU 154 has functions of executing driving control of the supply unit 110, the transport unit 120, and the carriage movement unit 140, printing control of the head unit, measurement control depending on the spectroscope 170 (driving control of the electrostatic actuator 56 in the wavelength variable interference filter 5, and light reception control of the light reception portion 173), a measurement process depending on the spectroscopic measurement results using the spectroscope 170, a correction (update) process of the printing profile data, and the like as a result of reading and executing various programs stored in the memory 153.

In the above-mentioned manner, according to the present embodiment in addition to the effects of the above-mentioned embodiments, it is possible to obtain the following effects.

According to the present embodiment, it is possible to provide a printer that is capable of performing spectroscopic measurement of a printing portion at a stable wavelength resolution using the spectroscope 170. To explain in more detail, in the wavelength variable interference filter 5, which is mounted in the spectroscope 170, transformation of a silver alloy reflective film is suppressed, and therefore, reliability is improved. Therefore, it is possible to transmit light of a target wavelength through the wavelength variable interference filter 5 at a high wavelength resolution and a sufficient light quantity. As a result of this, as a result of receiving the above-mentioned transmitted light in the light reception portion 173, it is possible to implement spectroscopic measurement of color patches as measurement targets with high accuracy.

In addition, in the related art, manpower and time were required in the adjustment (reproduction) of the color tone of a printing object, bit according to the present embodiment, it is possible to instantly correct printing profile data for which printing is executed, and therefore, it is possible to easily reproduce a desired color tone.

Additionally, the invention is not limited to the above-mentioned embodiment, and it is possible to apply various changes and improvements to the above-mentioned embodiment. Hereinafter, modification examples will be described.

Modification Example 1

The electronic apparatus of the above-mentioned embodiment described a printer as an example, but in addition to this, the invention can be applied to electronic components and electronic apparatuses in various fields in which the wavelength variable interference filter of the invention is mounted.

For example, a system based on an optical system for detecting the presence of a specified substance, or the like, may also be used as the another electronic apparatus. More specifically, examples of the above-mentioned system that uses a spectroscopic measurement method using the electronic component of the invention include an on-vehicle gas leak detector for detecting a specific gas with high sensitivity, a gas detector such as an optoacoustic trace gas detector for breath testing, and the like. Alternatively, it is possible to use a substance component analyzer that uses non-invasive measurement of saccharides using near infrared ray spectroscopy, non-invasive measurement with foodstuffs, biological bodies, minerals, or the like, as the target thereof.

In addition, for example, it is possible to transmit data with light by changing the intensity of the light of each wavelength as a function of time. In this case, it is possible to extract data transmitted due to light of a specific wavelength by dispersing light of the specific wavelength using the wavelength variable interference filter, and causing the light to be received by a light reception portion. It is possible to implement optical communication by processing data of the light of each wavelength using an electronic apparatus provided with such an electronic component for data extraction.

Furthermore, it is also possible to apply the invention to a spectroscopic camera, a spectroscopic analyzer, or the like that captures an image of a spectroscopic image by dispersing light using the electronic component of the invention as an electronic apparatus. In addition, the electronic component of the invention may also be used as a band-pass filter, and for example, among light of a predetermined wavelength that a light emitting element emits, it is possible to transmit only light of a narrow band with the predetermined wavelength as the center thereof by dispersing the light using the wavelength variable interference filter. Therefore, it is possible to use this configuration as an optical type laser device.

Alternatively, it is also possible to use the electronic component of the invention in a biological body recognition apparatus. For example, it is also possible to apply the invention to a recognition apparatus of blood vessels, fingerprints, retinas, irises, or the like, using the near infrared region or the visible light region.

In the above-mentioned manner, according to the present modification example, adoption in any apparatus that disperses light of a predetermined wavelength from incidence light, is also possible. In addition, miniaturization and a reduction in weight of an electronic component and an electronic apparatus are easier than in the related art in which a desired wavelength is taken out using a plurality of devices. In conjunction with this, since it is possible to disperse light of a plurality of wavelengths with the same electronic component, the efficiency of the process is improved. Accordingly, for example, it is possible to use the invention as an electronic component for a mobile phone of a vehicle.

The entire disclosure of Japanese Patent Application No. 2016-003292, filed Jan. 12, 2016 is expressly incorporated by reference herein.

What is claimed is:

1. A wavelength variable interference filter comprising:
   a first substrate;
   a first reflective film that is in contact with the first substrate;
   a second reflective film that faces the first reflective film; and
   a protective film that covers the first reflective film,
   wherein the first reflective film includes silver,
   wherein a concentration of a hydroxyl group that the first substrate includes is greater than 1500 ppm, and
   wherein the protective film includes indium gallium oxide having a transmittance of 80% or more in a wavelength region from 380 nm to 720 nm, a conductivity of 0.001 Ω·cm or less.

2. An electronic apparatus comprising the wavelength variable interference filter according to claim 1.

3. The wavelength variable interference filter according to claim 1, wherein the first reflective film consists of silver.

4. An electronic component comprising:
   the wavelength variable interference filter according to claim 1;
   a base substrate;
   a first lid portion, which is disposed facing the base substrate, and forms an accommodation portion for accommodating the wavelength variable interference filter between the first lid portion and the base substrate; and
   a joining member for joining the base substrate and the first lid portion.

5. A manufacturing method of the electronic component according to claim 4, the method comprising:
   configuring a housing by disposing the base substrate and the first lid portion using the joining member; and
   sealing the housing by heating the joining member.

6. The wavelength variable interference filter according to claim 1,
   wherein the first substrate is a quartz substrate.

7. An electronic component comprising:
   the wavelength variable interference filter according to claim 6;
   a base substrate;
   a first lid portion, which is disposed facing the base substrate, and forms an accommodation portion for accommodating the wavelength variable interference filter between the first lid portion and the base substrate; and
   a joining member for joining the base substrate and the first lid portion.

8. A manufacturing method of the electronic component according to claim 7, the method comprising:
   configuring a housing by disposing the base substrate and the first lid portion using the joining member; and
   sealing the housing by heating the joining member.

9. The wavelength variable interference filter according to claim 1,
   wherein a thickness of the first reflective film is 10 nm or more or 60 nm or less.

10. An electronic component comprising:
    the wavelength variable interference filter according to claim 9;
    a base substrate;
    a first lid portion, which is disposed facing the base substrate, and forms an accommodation portion for accommodating the wavelength variable interference filter between the first lid portion and the base substrate; and
    a joining member for joining the base substrate and the first lid portion.

11. A manufacturing method of the electronic component according to claim 10, the method comprising:
    configuring a housing by disposing the base substrate and the first lid portion using the joining member; and
    sealing the housing by heating the joining member.

12. The wavelength variable interference filter according to claim 1, further comprising a second substrate that faces the first substrate, the second reflective film being disposed on the second substrate,
    wherein the second substrate is a quartz substrate,
    wherein the second reflective film includes silver,
    wherein a concentration of a hydroxyl group that the second substrate includes is 500 ppm or less or 1000 ppm or more, and
    wherein the wavelength variable interference filter further comprises a protective film that covers the second reflective film.

13. An electronic component comprising:
    the wavelength variable interference filter according to claim 12;
    a base substrate;
    a first lid portion, which is disposed facing the base substrate, and forms an accommodation portion for accommodating the wavelength variable interference filter between the first lid portion and the base substrate; and
    a joining member for joining the base substrate and the first lid portion.

14. A manufacturing method of the electronic component according to claim 13, the method comprising:
    configuring a housing by disposing the base substrate and the first lid portion using the joining member; and
    sealing the housing by heating the joining member.

* * * * *